United States Patent [19]

Panzeri et al.

[11] Patent Number: 5,284,545
[45] Date of Patent: Feb. 8, 1994

[54] EQUIPMENT FOR PRODUCING INDUSTRIAL-USE TAPERING POLES FOR LIGHTING AND SIMILAR APPLICATIONS

[75] Inventors: Luca Panzeri, Vimercate; Alfonso Branca, Milan, both of Italy

[73] Assignee: P.C.R. S.r.l., Milan, Italy

[21] Appl. No.: 983,838

[22] Filed: Dec. 1, 1992

[30] Foreign Application Priority Data

Jan. 17, 1992 [IT] Italy .................. MI92 A 000080

[51] Int. Cl.$^5$ ............................................. B65H 81/00
[52] U.S. Cl. ..................................... 156/425; 156/441
[58] Field of Search ............. 156/161, 166, 169, 180, 156/425, 441

[56] References Cited

U.S. PATENT DOCUMENTS

| | | | |
|---|---|---|---|
| 3,442,738 | 5/1969 | Scott et al. | 156/180 X |
| 3,974,012 | 8/1976 | Hogarth | 156/161 |
| 4,155,791 | 5/1979 | Higuchi | 156/161 |

Primary Examiner—Jeff H. Aftergut
Attorney, Agent, or Firm—Laff, Whitesel, Conte & Saret

[57] ABSTRACT

The equipment (1) comprises a die (2) having a section of varying sizes and corresponding to the longitudinal and sequential lengths of a tapering pole to be manufactured, a former (3) substantially corresponding to the longitudinal cavity of the tapering pole, drive means (4) for moving the former (3) in a longitudinal direction through the die (2) and devices (6) for winding fiber materials on the former (3) and impregnating said materials with resins, said devices being disposed upstream of the die (2) of variable section.

11 Claims, 5 Drawing Sheets

EQUIPMENT FOR PRODUCING INDUSTRIAL-USE TAPERING POLES FOR LIGHTING AND SIMILAR APPLICATIONS

FIELD AND BACKGROUND OF THE INVENTION

The present invention relates to an equipment for producing industrial-use tapering poles for lighting and similar applications.

It is known that industrial-use poles and in particular poles designed to support telephone cables and cables for electric energy transport can be made of different types of materials.

Poles made of wood, reinforced concrete or steel are the most traditional ones.

Poles made of wood are economical, mechanically strong and resilient, above all if impregnated with appropriate resins. However they do not have a long lifetime and are not satisfactory from an ecological point of view both because they give rise to deforestation and because they emit toxic fumes resulting from the impregnating substances, when they are destroyed by combustion at the end of their life.

Reinforced concrete poles have some qualities as well, such as structural strength, reasonable costs and acceptable surface appearance, but they have a serious drawback in that their iron part can be chemically attacked through surface cracks and splits formed therein in time, and therefore they can undergo deterioration in a rather short period of time. In addition, it is clear that their destruction is difficult and troublesome.

Iron poles have excellent strength features and reasonable costs, but, on the other hand, they need frequent servicing works tending to avoid rust formation and to enable them to resist chemical attacks above all in sea salt-rich media.

Other types of materials based on the use of "rovings" of artificial fibers such as glass fibers, impregnated with synthetic resins, polyesters for example, are known too.

These materials have many advantages. In fact they are not attacked by weather agents, not even sea salts, practically have an unlimited lifetime, do not need to be painted and do not change colour by effect of UV rays.

Several different technologies for manufacturing poles are known, in particular for manufacturing internally-hollow tapering poles, which are generally preferred because they enable both weight and cost to be reduced.

In one of these known technologies a roving previously impregnated with synthetic resins is wound on a rotating mandrel by means of appropriate delivery carriages movable along the mandrel axis. The mandrel covered with the desired amount of the above fibers is transferred to an oven for hardening of the material. Subsequently it is removed from the oven and the separation between the mandrel and the now hardened cover constituting the pole is carried out by means of presses. Not only the above described production process has big problems during the step of extracting the mandrel from the pole, but it also gives rise to poles having rough surfaces.

In a second known technology for manufacturing poles of fiber materials, a roving impregnated with resins or a non-impregnated fiber fabric is wound as in the previous case around a mandrel. Subsequently the thus coated mandrel is introduced into a heated mould the sizes of which correspond to those of the mandrel itself. If non-impregnated fabrics are used, the intended resin is then injected into said mould. In this second case as well, the pole surface is not particularly smooth and irregularities can occur in the distribution of the fibers and, as a result, the mechanical strength is reduced.

In a third type of production process provision is made for the use of a rotating heated die the shape of which matches the shape of the outer surface of the pole to be produced. When the die is stationary, a mandrel is introduced thereinto, on which mandrel layers of fabric have been previously wound so as to make the desired variations in the pole diameter. When the die is set in rotation the fabric will tend to adhere to the die itself by centrifugal force, and simultaneously resin for impregnating the different fabric layers will be admitted thereinto.

Although poles obtained by adopting the last mentioned production technology have an excellent surface appearance and good mechanical strength, they however involve the use of equipments having inelasticity in operation (if it is considered that each machine can make poles of three or four lengths which however have one taper only). In addition the use of particular fabrics or composite materials manufactured by specialized firms, makes prices rise.

SUMMARY OF THE INVENTION

Under this situation, the technical task underlying the present invention is to devise an equipment for producing industrial-use tapering poles for lighting and similar applications, capable of substantially eliminating the above mentioned drawbacks.

Within the scope of this technical task it is an important object of the invention to devise an equipment enabling industrial-use tapering poles for lighting and similar applications to be produced which have excellent strength and durability features and also offer a smooth and aesthetically acceptable surface.

Another important object of the invention is to devise an equipment in which the different components have reduced longitudinal sizes as compared to the length of the tapering pole to be produced.

Another object of the invention is to provide an equipment of easy and ready adaptability to the technical and dimensional requirements of the poles to be produced.

A still further object of the invention is to provide an equipment capable of reducing the all-in production cost of each pole.

The technical task mentioned and the objects specified are substantially achieved by an equipment for producing industrial-use tapering poles, for lighting and similar applications, comprising:

a die having a section of varying sizes corresponding to the longitudinal and sequential lengths of a tapering pole to be produced, a former substantially corresponding to the longitudinal cavity of said tapering pole, drive means for moving said former in a longitudinal direction at least through said die, and devices for winding fiber materials on said former and impregnating the fiber materials with resins, said devices being disposed upstream of said die.

BRIEF DESCRIPTION OF THE DRAWINGS

The description of two preferred embodiments of an equipment in accordance with the invention is given hereinafter by way of non-limiting example, with the aid of the accompanying drawings, in which.

DESCRIPTION OF THE PREFERRED EMBODIMENTS

Figure 1:
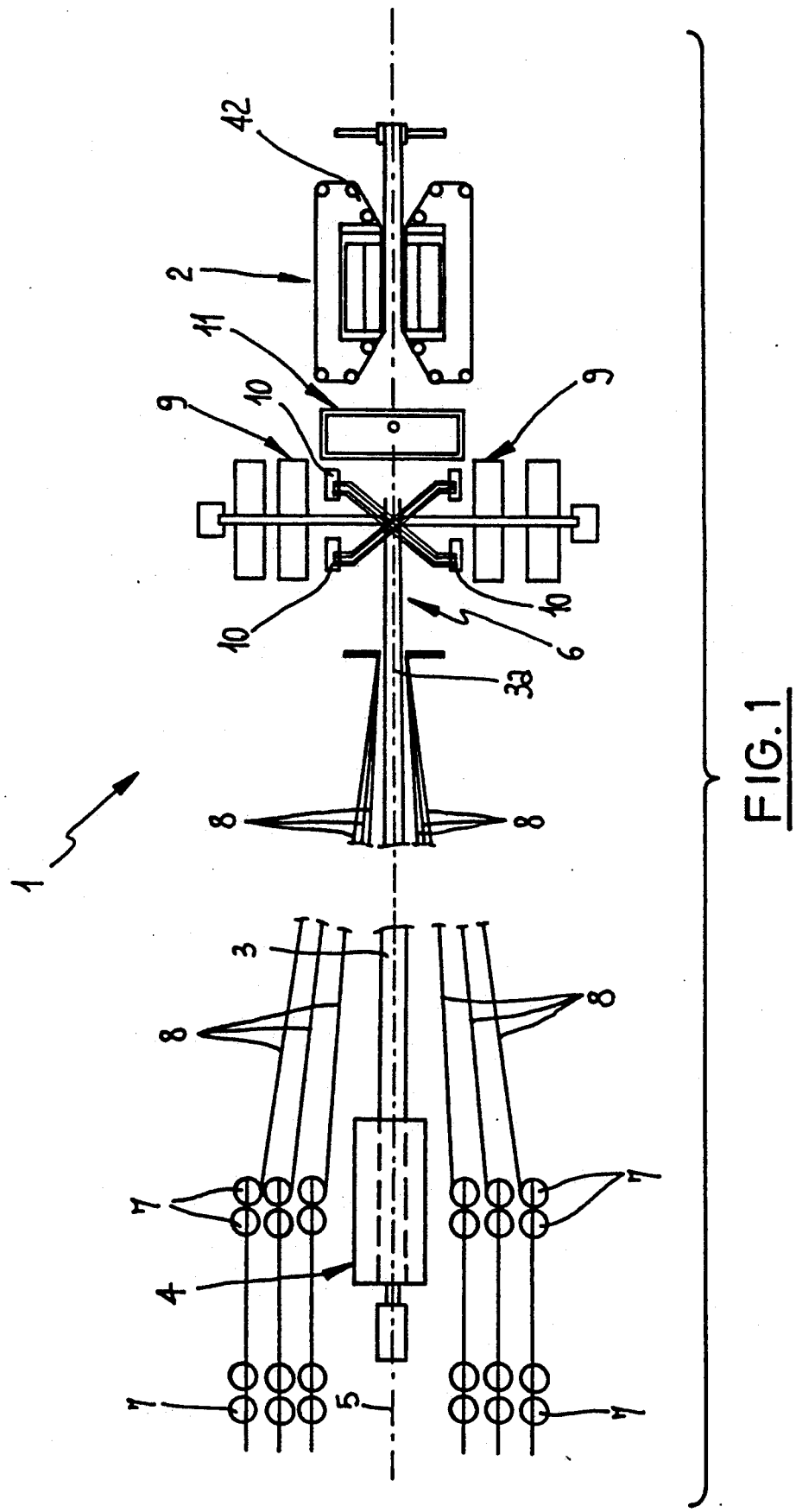
FIG. 1 diagrammatically shows the equipment in accordance with the invention.

Referring to the drawings, the equipment for producing industrial-use tapering poles for lighting and similar applications in accordance with the invention has been generally identified by reference numeral 1.

It comprises a die of varying section 2 adapted to define the outer surface of longitudinal and sequential lengths of a tapering pole to be manufactured in one and the same equipment 1.

The die 2 can be passed through by a former 3 corresponding to the longitudinal cavity of the pole to be manufacture and being therefore of tapering shape. The former 3 is made longitudinally movable by drive means 4, for example comprising a carriage adapted to make the former move backward and forward at a controlled speed in the longitudinal work direction coincident with the central axis 5 of the former itself. In addition the former 3 is substantially defined by a mandrel having a section tapering in the advance direction and consisting of several longitudinal portions adapted to move close to and apart from each other so as to respectively increase or reduce the transverse sizes of former 3. Upstream of the die 2 devices 6 for winding fiber materials on the former 3 and impregnating them with resins are provided.

More particularly, the devices 6 are comprised of reels on which rovings 8 of fiber materials such as glass fibers are wound, said reels being disposed a certain distance from the die 2, which distance substantially corresponds to the former length. Rovings 8, which are longitudinally united, are kept taut and engaged to the former 3 at the front end 3a thereof corresponding to the thinner end, so that while the former 3 is moving forward, they practically define the weft of the fiber layer to be disposed on the former 3 itself.

A pair of roving supply members 9 is located intermediate the die 2 and reels 7 so as to transversely envelop, like a warp yarn, the longitudinal rovings 8 passing thereat. Suitable impregnation vats 10 enable said transverse rovings to be imbued with resins and an impregnation station 11 carries out the completion of the resin penetration into the fiber layers disposed on the former 3 as they move forward and before they reach the die 2.

As the impregnation resins, thermoplastic and thermosetting resins are preferably employed. They are selected from the group consisting of epoxy resins, unsaturated polyester resins, phenol-formaldehyde, polyimide, vinyl and acrylate resins, and thermoplastic polymers such as polyolefins, polyamides, polyesters, polycarbonates, polyphenylsulphides, polyetherketones, polysulphones and copolymers thereof.

The die 2 comprises a substantially tubular bearing structure 12 the longitudinal axis 13 of which is coincident with the central axis 5; it consists of a succession (nine for example) of beams 14, engaged with one another in the form of a polygon and supported by support feet 14a.

A shell-like mould 15 of varying conformation is located within the bearing structure 12. The mould 15 is adapted to continuously define the outer surface of said longitudinal and sequential lengths of the pole being formed on the former 3.

Provision is also made for a plurality of pusher elements 16 engaged to the bearing structure 12 and simultaneously active on the external part of the shell-like mould 15, in timed relationship with the forward movement of the former 3 through the shell-like mould 15.

The pusher elements 16 are divided into groups operated independently of one another and disposed in the form of a star, that is substantially in a converging relationship, on two planes 17 transverse to the longitudinal axis 13 and spaced apart from each other so as to be substantially close to the ends of the shell-like mould 15.

Figure 2:
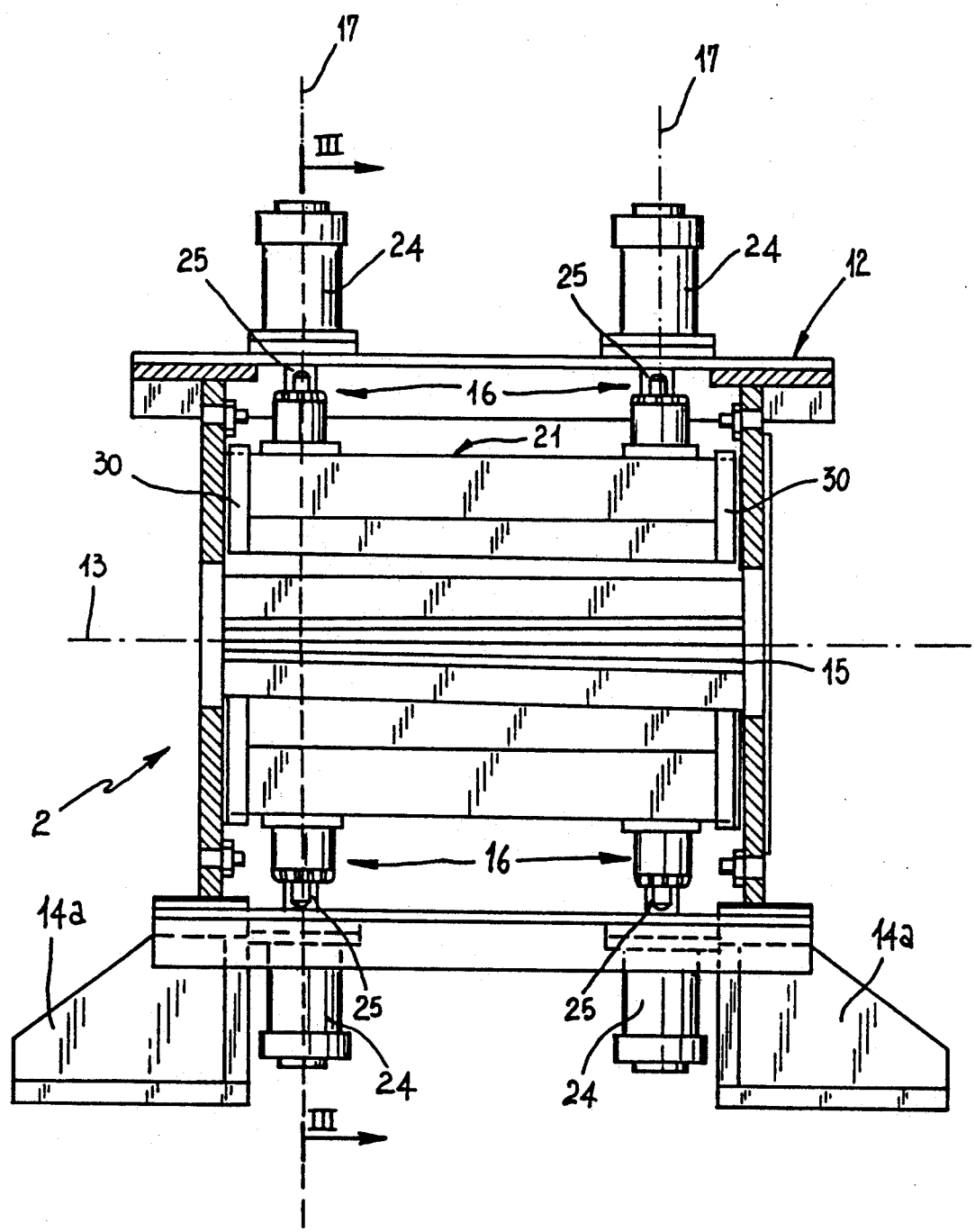
FIG. 2 is a longitudinal part sectional view of one embodiment of a die having varying sectional sizes and being part of the equipment in FIG. 1.
Figure 3:
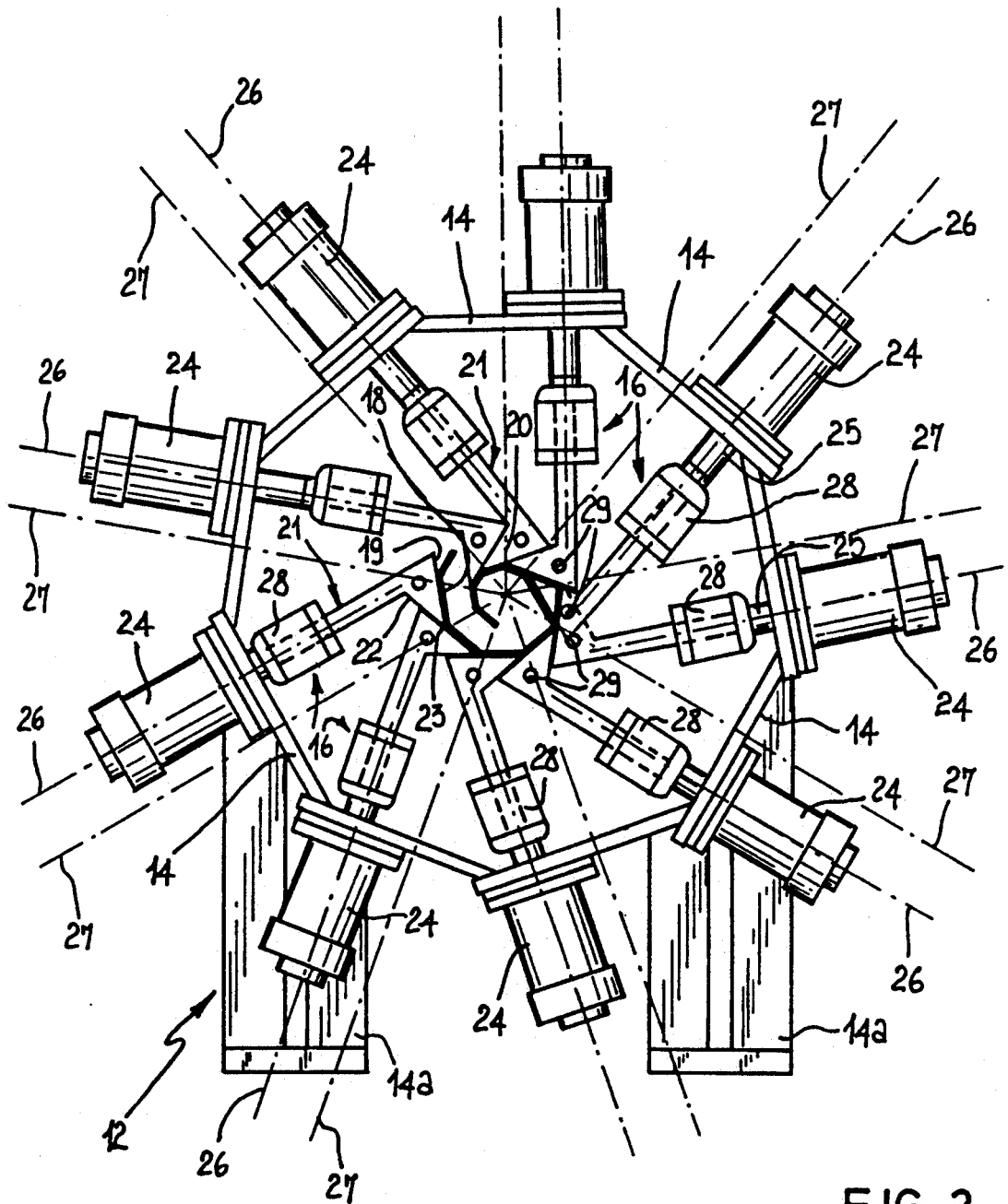
FIG. 3 is a sectional view taken along line III—III in FIG. 2.

In one embodiment shown in FIGS. 2 and 3, the shell-like mould 15 has transverse sections substantially in the form of regular polygons of varying sizes that become smaller in the advance direction of the former 3. Practically, the shell-like mould 2 comprises a plurality of active surfaces, nine for example, extending substantially in the direction of the longitudinal axis 13 and each located close to a distinct side 18 of said regular polygons. The active surfaces are defined by varying portions of the main faces 19 of substantially wedge-shaped tailpieces 20 belonging to prismatic elements 21 disposed in interlaced ring relationship.

In greater detail, each wedge-shaped tailpiece 20 comprises, in addition to the main face 19, an auxiliary face 22. These faces converge into a corner 23 so as to form an angle being the supplementary angle of the interior angle defined by two adjacent sides of said regular polygon. Corners 23 define the vertices of the regular polygons constituting the sections of the shell-like mould 15. Each auxiliary face 22 is operatively slidable on and in contact with the main face 19 of the adjacent prismatic element 21 so as to confine, on said main face, the active surface corresponding to the side 18.

Each prismatic element 21 is connected to a pair of corresponding pusher elements 16 disposed in the two transverse planes 17, that is longitudinally in alignment. The pusher elements 16 are defined by fluid-operated cylinders 24 the rods 25 of which are movable along parallel shifting axes 26 which are spaced apart the same distance from radii 27 passing by the vertices of said regular polygons. In this way the regular corners 23 during the traverse motion of the rods 25 move along the directions defined by radii 27.

The connection between the rods 25 and prismatic elements 21 is made by sleeves 28. Within the prismatic elements 21 channels 29 are provided for passage of liquid or diathermic oil adapted to heat the shell-like mould 15 to the predetermined temperature.

Finally, endwise and sideways of the prismatic elements 21 slid guides 30 are provided (FIG. 2) which are adapted to exactly define the linear path to be taken by the prismatic elements 21.

Figure 4:
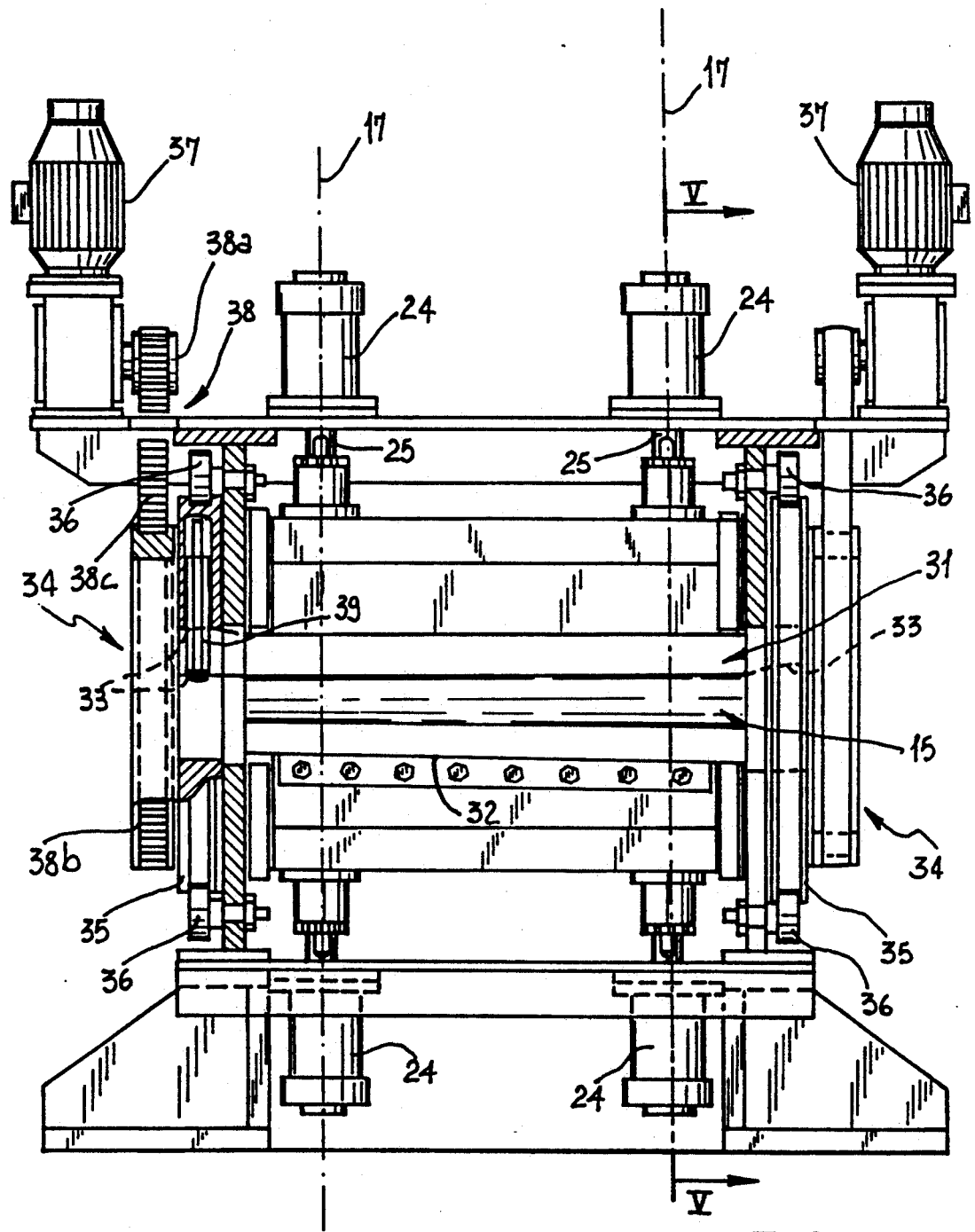
FIG. 4 is a longitudinal part sectional view of a second embodiment of a second die having varying sectional sizes and being part of the equipment in FIG. 1.
Figure 5:
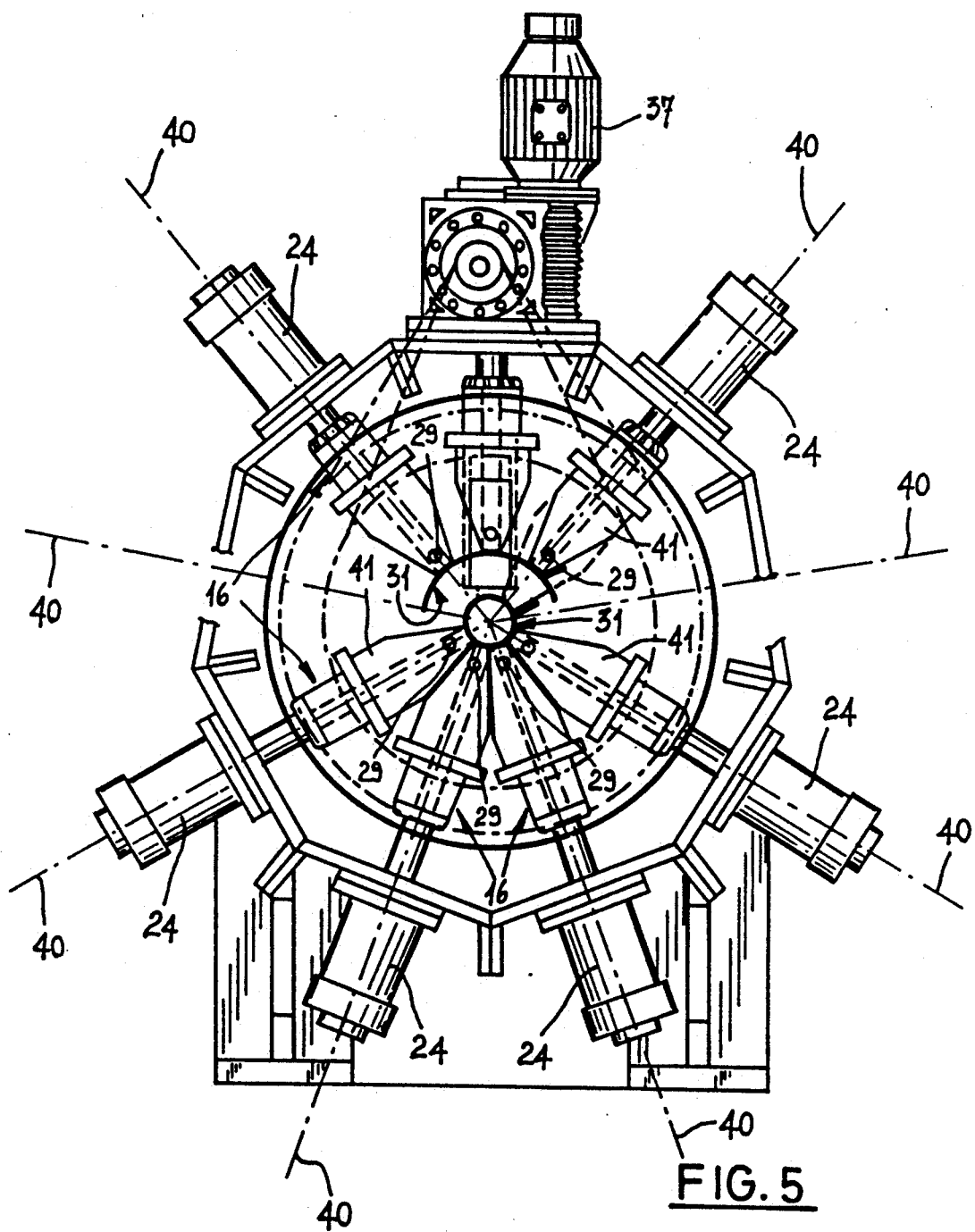
FIG. 5 is a sectional view taken along line V—V in FIG. 4.

In a second embodiment shown in FIGS. 4 and 5, the shell-like mould 15 has substantially circular transverse sections and comprises a spring plate 31 would spiralwise on itself so as to internally define a frusto-conical active surface of varying sizes that is capable of being selectively expanded and contracted.

An outer edge 32 of the plate 31 is kept locked whereas the inner border has terminal tailpieces 33 at its end that are engaged to means 34 for the controlled winding and unwinding of the plate 31 which means is active in timed relationship with the pusher elements 16.

The controlled-winding and unwinding means 34 comprises, at each terminal tailpiece 33, a circular plateform 35 peripherally slidable on a plurality of guide and support rollers 36 so that it is rotatably movable about the longitudinal axis 13. A drive motor 37 and kinematic driving members 38, for example comprised of a pinion gear 38a, a toothed wheel 38b and a toothed belt 38c, enable the rotation of each circular platform 35 to be operated and controlled. A radially movable slide 39 engaging the terminal tailpiece 33 is provided on said platform 35. The pusher elements 16 comprise fluid-operated cylinders 24 having rods 25 movable along radially-disposed shifting lines 40 angularly spaced apart the same distance in the transverse planes 17. A prismatic block 41 the section of which has a centripetally decreasing width is engaged to each pair of fluid-operated cylinders 24 belonging to the transverse planes 17 and longitudinally aligned. All together the prismatic blocks 41 define a series of crown-wise disposed struts acting externally on the spring plate 31.

A programmable control unit not shown in the accompanying drawings is capable of coordinating the displacements of the former 3, the rotation of the circular platforms 35 and the shiftings of the rods 25 of the fluid-operated cylinders 24, based on temperature variations.

Provision is finally made for a device 42 (FIG. 1) lining the inner surface of the shell-like mould 15, which device uses sheets of materials promoting sliding of the fiber fabric through the die 2. These sheets are suitably wrapped also around the former 3 in order to facilitate the extraction thereof from the pole when hardening of the latter has occurred.

Operation of the equipment in accordance with the invention described above mainly as regards structure, is as follows.

After locking the longitudinal rovings to the front end 3a of the former 3, the former itself, kept in its maximum-expanded condition, is caused to move forward by the drive means 4 through the devices 6 where wrapping of the transverse rovings occurs as well as impregnation of the fabrics thus formed with appropriate resins. The former 3 is oriented so that its front end 3a corresponds to the smaller section, and therefore sections of increasingly larger sizes pass through the die 2. Practically, as the fiber material passes through the die 2 and hardens as a result of known polymerization processes, pulling along of the upstream fabric is carried out by the already hardened fabric.

If poles of polygonal section are intended to be produced, it is necessary to use a die 2 in accordance with the first embodiment, as shown in FIGS. 2 and 3. In this case initially the prismatic elements 21 are placed by the fluid-operated cylinders 24 to the position which is the closest to the longitudinal axis 13, that is they define polygonal sections shaped according to a maximum contraction. This situation is shown in the upper part of FIG. 3 where four prismatic elements 21 in the position in which they are the closest to each other are shown.

As the former 3 moves forward and in timed relationship with this advance movement, the prismatic elements 21 are shifted outwardly so that the portions of the main faces 19 confined by corners 23 define the active surfaces constantly in contact with the fibers of the fabric wound on the former 3, to the desired pressure imposed by the fluid-operated cylinders 24.

In the lower part of FIG. 3 five prismatic elements disposed in an expanded condition are shown. It is pointed out that passing through successive larger conformations of the polygonal sections of the shell-like mould 15 takes place gradually and obviously to a differentiated extent on each transverse plane 17. The displacement law for the prismatic elements 21 can be selected depending on the desired transverse sizes of the pole.

When the passage of former 3 through the die 2 has been completed, the drive means 4 causes the former 3 to move backward after it has been disposed in the contacted condition, so that it can be extracted from the manufactured pole and brought back to the initial position for starting the production of another pole.

If poles of circular section are intended to be produced, the second embodiment of the die 2 shown in FIGS. 4 and 5 is used.

First of all the winding means 34 is operated in order to cause the spiral-wise winding of the spring plate 31. More particularly, the rotation of the circular platforms 35 causes the displacement of the slide 39 and terminal tailpieces 33 engages thereto towards the centre, which makes the spring plate 31 to be wound spiral-wise upon itself.

Subsequently while the former is passing through the frusto-conical space defined by the spring plate 31, said plate widens out progressively and to a controlled extend due to the intervention of the drive motors 37, whereas the prismatic blocks 41, urged by the fluid-operated cylinders 24, keep the outer surface of the plate 31 to the predetermined moulding pressure and the desired conformation.

On the upper part of FIG. 5 there is shown some prismatic blocks 41 disposed at a position corresponding to an expanded circular section of the shell-like mould 15, whereas on the lower part of FIG. 5 some prismatic blocks corresponding to a contracted circular section of the shell-like mould 15 are shown.

It will be recognized that the particular embodiments shown are also advantageous in their most specific aspects.

The invention is not considered limited to the examples chosen for purposes of illustration, and includes all changes and modifications which do not constitute a departure from the true scope of this invention as claimed in the following claims.

In practice, the materials used can be of any type and the shapes and sizes of any nature and magnitude as required.

What is claimed is:

1. An equipment for producing industrial-use tapering poles for lighting comprising:
   a die having a section of varying sizes corresponding to the longitudinal and sequential lengths of a tapering pole to be produced, a former substantially corresponding to a longitudinal cavity of said tapering pole to be produced, drive means for moving said formed in a longitudinal direction at least through said die, and devices for winding fiber materials on said former and impregnating the fiber materials with resins, said devices (6) being disposed upstream of said die, said die having a bearing structure a shell-like mould of varying conformation, adapted to continuously define and outer surface of the longitudinal and sequential lengths of said tapering pole, and a plurality of pusher elements engaged to said bearing structure and simultaneously active on an external part of said shell-like mould, in timed relationship with an advance movement of said former through the shell-like mould itself, so as to achieve continuous production of each longitudinal length of said pole to a predetermined moulding pressure.

2. The equipment as claimed in claim 1, wherein said plurality of pusher elements is divided into two groups operated independently of each other and spaced apart from each other along said longitudinal direction, each group being comprised of pusher elements substantially disposed in a converging relationship in a plane transverse to said longitudinal direction.

3. The equipment as claimed in claim 2, wherein said shell-like mould has transverse sections substantially in a form of regular polygons and comprises a plurality of flat active surfaces substantially extending in the direction of said longitudinal axis and each corresponding to one side of said regular polygons, said flat active surfaces being defined by main face portions of respective prismatic elements each connected to a pair of said pusher elements corresponding with each other, at transverse planes, and in that said prismatic elements are disposed in interlaced ring relationship.

4. The equipment as claimed in claim 3, wherein each of said prismatic elements comprises a substantially wedge-shaped tailpiece formed with said main face and an auxiliary face converging with said main face into a corner, the corners of said tailpieces defining the vertices of said regular polygons and the auxiliary face of each tailpiece being slidable on, and operatively in contact with, the main face of an adjacent prismatic element while said pusher elements are moving.

5. The equipment as claimed in claim 4, wherein said pusher elements are defined by fluid-operated cylinders provided with rods movable along parallel shifting axes, spaced apart a same distance from the radii passing by the vertices of said polygons so that said corners move along directions defined by said radii.

6. The equipment as claimed in claim 1, wherein said shell-like mould has substantially circular transverse sections and comprises a spring plate which is wound spiral-wise on itself so as to internally define a frusto-conical active surface capable of being selectively expanded and contracted, and in that provision is made for means for a controlled winding and unwinding of said spring plate, said means acting in timed relationship with said pusher elements.

7. The equipment as claimed n claim 6, wherein said winding and unwinding means comprises:

a pair of circular platforms disposed endwise at ends of said spring plate and rotatably movable about an axis coincident with said longitudinal direction, a pair of slides radially movable each on one of said circular platforms, tailpieces of an inner border of said spring plate being engaged to said slides, and a drive motor and kinematic driving members operatively connected to each of said circular platforms.

8. The equipment as claimed in claim 6, wherein said pusher elements are provided with rods movable along radially-disposed shifting lines angularly spaced apart by a same distance in said transverse planes.

9. The equipment as claimed in claim 1, wherein the impregnation resins are resins selected from the group consisting of epoxy resins, unsaturated polyester resins, phenolformaldehyde, vinyl and acrylate resins, and thermoplastic polyolefins, polyamides, thermoplastic polyesters, polycarbonates, polyphenylsulphides, polyetherketones, polysulphones and copolymers thereof.

10. The equipment as claimed in claim 1, wherein said bearing structure is substantially tubular and has a longitudinal advance direction of said former.

11. An equipment for producing industrial-use tapering poles for lighting, comprising:

a die having a section of varying sizes corresponding to longitudinal and sequential lengths of a tapering pole to be produced, a former substantially corresponding to a longitudinal cavity of said tapering pole to be produced, drive means for moving said former in a longitudinal advance direction at least through said die, devices for winding fiber materials on said former and impregnating the fiber materials with resins, said devices being disposed upstream of said die, said die being formed by a shell-like mould of varying conformation, adapted to continuously define an outer surface of the longitudinal and sequential lengths of said tapering pole, said shell-like mould having substantially circular transverse sections and a spring plate which is wound spiral-wise on itself so as to internally define a frusto-conical active surface capable of being selectively expanded and contracted, and means for a controlled winding and unwinding of said spring plate.

* * * * *